(12) United States Patent
Mital et al.

(10) Patent No.: US 8,949,838 B2
(45) Date of Patent: Feb. 3, 2015

(54) MULTI-THREADED PROCESSING WITH HARDWARE ACCELERATORS

(75) Inventors: Deepak Mital, Orefield, PA (US); William Burroughs, Macungie, PA (US); Eran Dosh, Tel Mond (IL); Eyal Rosin, Rosh Ha'ayin (IL)

(73) Assignee: LSI Corporation, Milpitas, CA (US)

( * ) Notice: Subject to any disclaimer, the term of this patent is extended or adjusted under 35 U.S.C. 154(b) by 280 days.

(21) Appl. No.: 13/474,114

(22) Filed: May 17, 2012

(65) Prior Publication Data

US 2012/0230341 A1 Sep. 13, 2012

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, which is a continuation-in-part of application No. 12/782,411, filed on May 18, 2010, now Pat. No. 8,407,707.

(60) Provisional application No. 61/486,811, filed on May 17, 2011.

(51) Int. Cl.
| | |
|---|---|
| G06F 9/46 | (2006.01) |
| G06F 9/48 | (2006.01) |
| G06F 9/30 | (2006.01) |
| G06F 9/38 | (2006.01) |
| H04L 12/933 | (2013.01) |
| H04L 12/931 | (2013.01) |
| H04L 12/851 | (2013.01) |

(52) U.S. Cl.
CPC ............ *G06F 9/4881* (2013.01); *G06F 9/3009* (2013.01); *G06F 9/3851* (2013.01); *G06F 9/3877* (2013.01); *H04L 49/109* (2013.01); *H04L 49/506* (2013.01); *H04L 47/2408* (2013.01); *H04L 47/2441* (2013.01)
USPC .......................................................... 718/102

(58) Field of Classification Search
CPC .................................. G06F 9/4881; G06F 9/48
See application file for complete search history.

(56) References Cited

U.S. PATENT DOCUMENTS

| | | |
|---|---|---|
| 5,893,120 A | 4/1999 | Nemes |
| 5,909,695 A | 6/1999 | Wong et al. |
| 5,974,421 A | 10/1999 | Krishnaswamy et al. |
| 6,052,697 A | 4/2000 | Bennett et al. |
| 6,115,802 A | 9/2000 | Tock et al. |
| 7,085,911 B2 | 8/2006 | Sachedina et al. |

(Continued)

*Primary Examiner* — Mengyao Zhe

(74) *Attorney, Agent, or Firm* — Daniel J. Santos; Smith Risley Tempel Santos LLC

(57) ABSTRACT

Described embodiments process multiple threads of commands in a network processor. One or more tasks are generated corresponding to each received packet, and the tasks are provided to a packet processor module (MPP). A scheduler associates each received task with a command flow. A thread updater writes state data corresponding to the flow to a context memory. The scheduler determines an order of processing of the command flows. When a processing thread of a multi-thread processor is available, the thread updater loads, from the context memory, state data for at least one scheduled flow to one of the multi-thread processors. The multi-thread processor processes a next command of the flow based on the loaded state data. If the processed command requires operation of a co-processor module, the multi-thread processor sends a co-processor request and switches command processing from the first flow to a second flow.

32 Claims, 3 Drawing Sheets

(56) References Cited

U.S. PATENT DOCUMENTS

| | | |
|---|---|---|
| 7,287,046 B2 | 10/2007 | Bulka et al. |
| 8,065,678 B2 * | 11/2011 | Sydir et al. .................. 718/100 |
| 2003/0115417 A1 | 6/2003 | Corrigan |
| 2010/0246584 A1 * | 9/2010 | Ferguson et al. ............. 370/392 |
| 2012/0159494 A1 * | 6/2012 | Shafiee et al. ................ 718/102 |

* cited by examiner

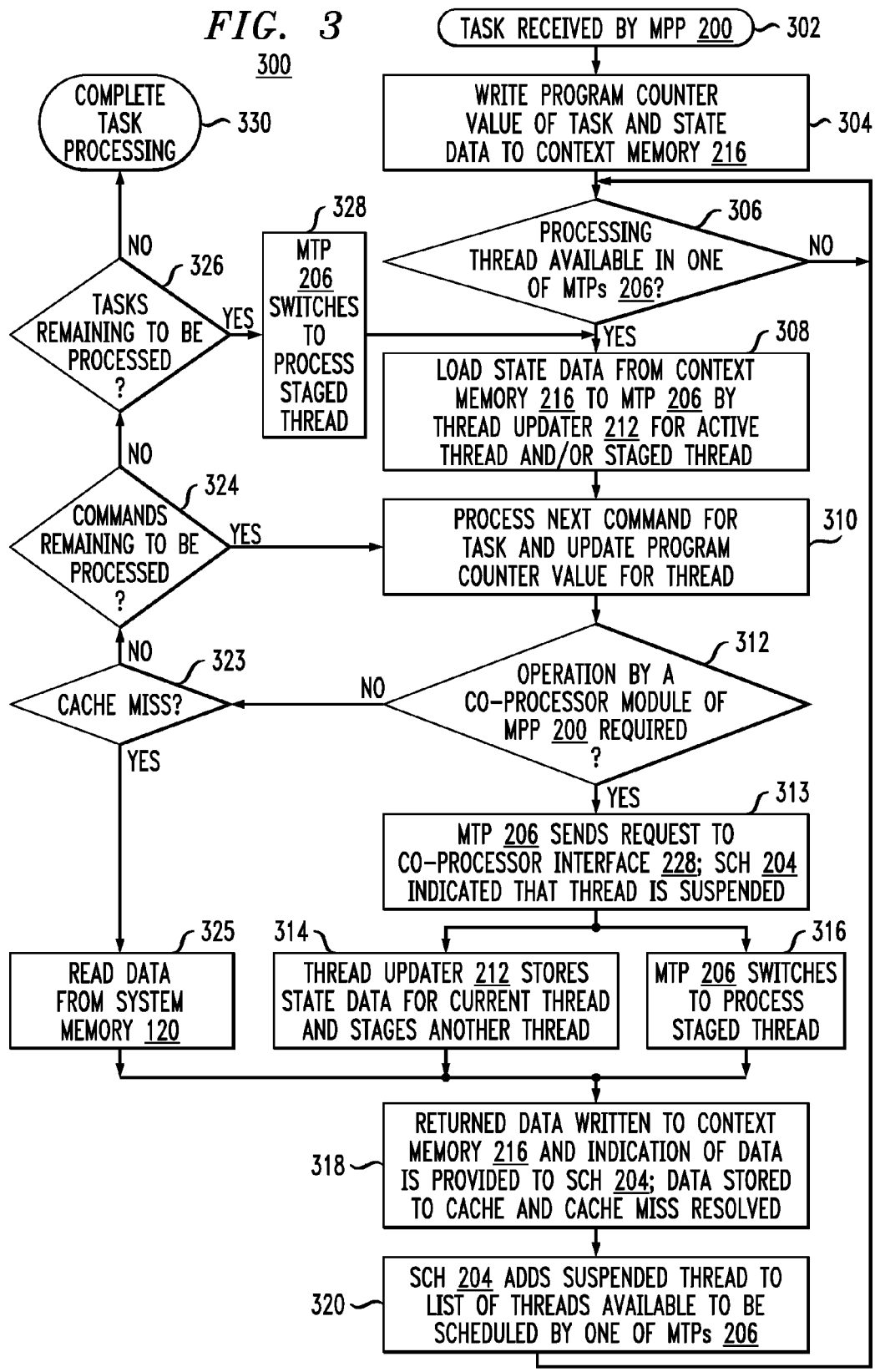

MULTI-THREADED PROCESSING WITH HARDWARE ACCELERATORS

CROSS-REFERENCE TO RELATED APPLICATIONS

This application claims the benefit of the filing date of U.S. provisional application No. 61/486,811 filed May 17, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644, and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, now issued as U.S. Pat. No. 8,243,737, Ser. No. 12/729,231 filed Mar. 22, 2010 now issued as U.S. Pat. No. 8,473,657, Ser. No. 12/963,895 filed Dec. 9, 2010, now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28, 2010, now issued as U.S. Pat. No. 8,489,794, Ser. No. 13/046,726 filed Mar. 12, 2011, now issued as U.S. Pat. No. 8,537,832, Ser. No. 13/046,717 filed Mar. 12, 2011, now issued as U.S. Pat. No. 8,539,199, Ser. No. 13/046,719 filed Mar. 12, 2011, now issued as U.S. Pat. No. 8,321,385, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, now issued as U.S. Pat. No. 8,683,221, Ser. No. 13/310,961 filed Dec. 5, 2011, Ser. No. 13/316,145 filed Dec. 9, 2011, Ser. No. 13/359,690 filed Jan. 27, 2012, now issued as U.S. Pat. No. 8,677,075, Ser. No. 13/405,053 filed Feb. 23, 2012, now issued as U.S. Pat. No. 8,761,204, Ser. No. 13/403,468 filed Feb. 23, 2012, now issued as U.S. Pat. No. 8,515,965, and Ser. No. 13/409,432 filed Mar. 1, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

Network processors implemented as an SoC having multiple processing modules might typically employ one or more hardware accelerators to implement well defined procedures to improve the efficiency and performance of the SoC. One or more flexible or "control" points in the system might be implemented using one or more programmable processors. The one or more control processors make function calls to the one or more hardware accelerators to perform data operations for a given job. Each of these function calls require a given amount of time to complete the data operation. If a given hardware accelerator is busy, the control processor might desirably process data or function calls for another job. When switching between jobs, the control processor might typically transfer a state of the previous job from one or more registers of the processor to a memory, and then begin processing the next job. When the busy hardware accelerator completes its operation, the control processor might switch back to the previous job by retrieving the state data from the memory and restoring the state data to the registers. Typical SoC's have numerous processors and, thus, large amounts of processor state data that might need to be written to, and read from, the memory to switch between jobs. As this amount of data increases, the control processors might suffer a loss in performance to switch between jobs. Thus, an improved system for integrating one or more general purpose processors and one or more hardware acceleration engines is needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments process multiple threads of commands in a network processor. One or more tasks are generated corresponding to each received packet, and the tasks are provided to a packet processor module (MPP). A scheduler associates each received task with a command flow. A thread updater writes state data corresponding to the flow to a context memory. The scheduler determines an order of processing of the command flows. When a processing thread of a multi-thread processor is available, the thread updater loads, from the context memory, state data for at least one scheduled flow to one of the multi-thread processors. The multi-thread processor processes a next command of the flow based on the loaded state data. If the processed command requires operation of a co-processor module, the multi-thread processor sends a co-processor request and switches command processing from the first flow to a second flow.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

FIG. 3 shows an exemplary flow diagram of a task thread process of the modular packet processor of FIG. 2 in accordance with exemplary embodiments.

DETAILED DESCRIPTION

In accordance with described embodiments, multithreading is used to provide a run-to-completion model for software running on one or more control processors with calls to the acceleration engines embedded in the software. The control processors are not thread-aware and do not have degraded performance when switching between threads.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | IP | Internet Protocol |
| SoC | System-on-Chip | µP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | SPP | Security Protocol Processor |
| MTM | Modular Traffic Manager | MMB | Memory Manager Block |
| SEM | Semaphore Engine | SED | Stream Editor |
| HE | Hash Engine | PIC | Packet Integrity Checker |
| SE | State Engine | SCH | Scheduler |
| PC | Program Counter | PDU | Protocol Data Unit |
| VAT | Virtual Address Translation Table | DMA | Direct Memory Access |

Figure 1:
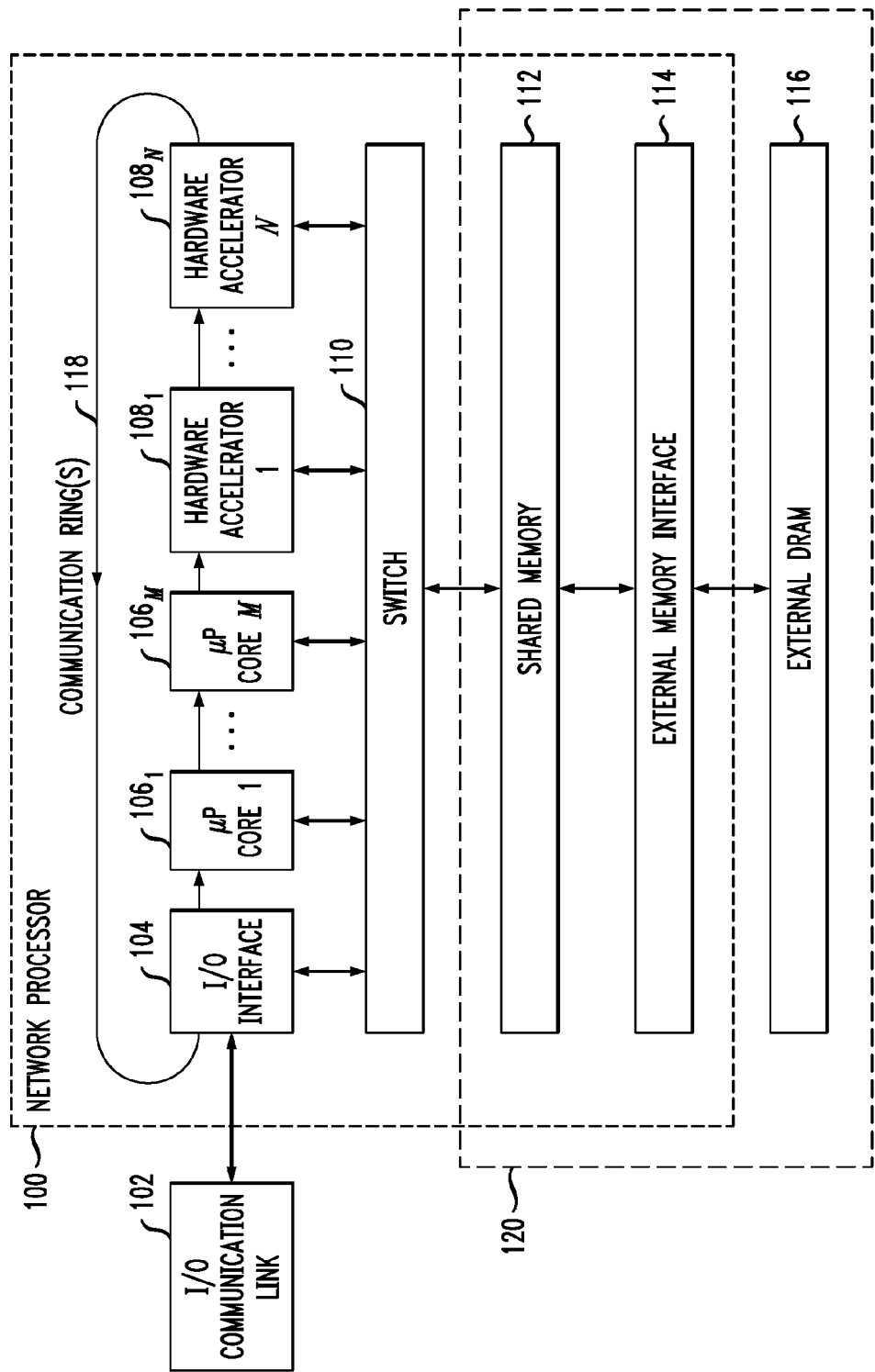
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts for each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, and blocks might be available in various predetermined sizes. For example, the blocks might typically be in one of the following sizes: 256, 2048, 16384, and 65536 bytes. The MMB might operate substantially as described in related U.S. patent application Ser. No. 12/963,895 filed Dec. 9, 2010, and Ser. No. 13/359,690 filed Jan. 27, 2012, which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, which are incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the MPP. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, and Ser. No. 13/403,468 filed Feb. 23, 2012, which are incorporated by reference herein.

Figure 2:
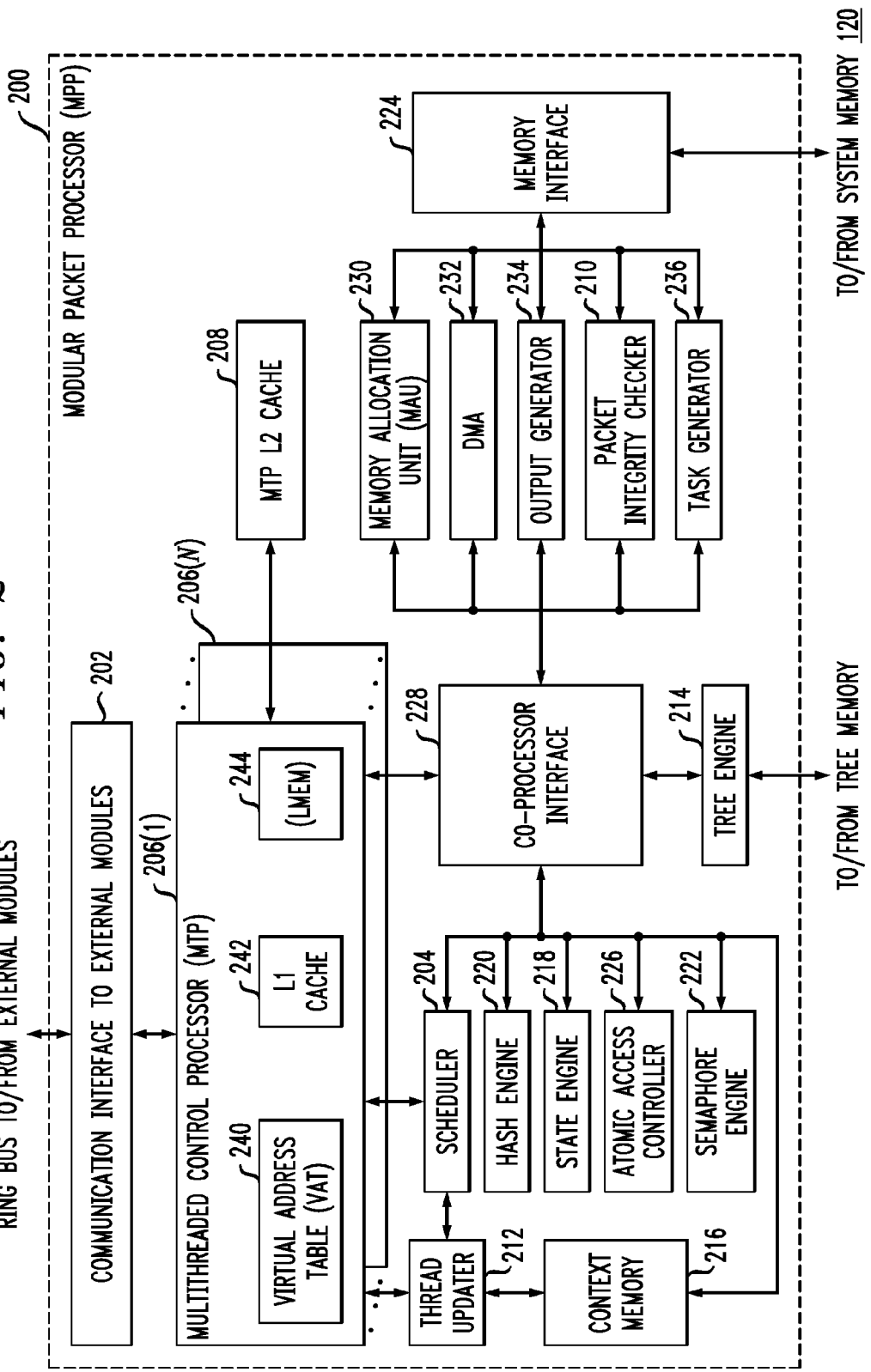
FIG. 2 shows a block diagram of a modular packet processor submodule of the network processor of FIG. 1 in accordance with exemplary embodiments.

FIG. 2 shows a block diagram of an exemplary MPP 200, in accordance with embodiments of the present invention. MPP 200 might receive an input task from any μP core or accelerator (e.g., μP cores 106 or accelerators 108) of network processor 100. MPP 200 performs operations specified by the input task on a data packet stored in at least one of shared memory 112 and external memory 116. When MPP 200 is finished operating on the data packet, MPP 200 might generate an output task to another μP core or accelerator of network processor 100, for example, a next μP core or accelerator specified for a given virtual flow identifier.

As described herein, MPP 200 might generally be employed as a packet classification engine in network processor 100. In general, packet classification categorizes packets into classes, for example, based on port number or protocol. Each resulting packet class might be treated differently to control packet flow, for example, each packet class might be subject to a different rate limit or prioritized differently relative to other packet classes. Classification is achieved by various means. Matching bit patterns of data to those of known protocols is a simple, yet widely-used technique. More advanced traffic classification techniques rely on statistical analysis of attributes such as byte frequencies, packet sizes and packet inter-arrival times. Upon classifying a traffic flow using a particular protocol, a predetermined policy can be applied to it and other flows to either guarantee a certain quality (as with VoIP or media streaming service) or to provide best-effort delivery.

MPP 200 might typically receive input tasks via a task ring such as described in U.S. patent application Ser. No. 12/782,379 filed May 18, 2010. Additionally, MPP 200 might receive a timer event via a timer ring. Receiving a task or receiving a timer event results in a context being generated in MPP 200 corresponding to the received task or timer event. Upon receiving a task, MPP 200 reads the task data from system memory 112, for example via communication interface 202 and memory interface 224. MPP 200 might track a virtual flow identifier (vflow ID) and an index (vflow Index) with each output task, indicative of what one(s) of cores 106 or accelerators 108 operate on a data packet after MPP 200 has finished its processing. Communication interface 202 generates an output task based on the vflow ID and vflow Index and the output task is transmitted, for example via a task ring, to the subsequent destination module. An input task might result in the generation of multiple output tasks. As described herein, MPP 200 maintains task order between input and output, such that output tasks are generated in the order in which the input tasks are received by MPP 200, and thus also the order in which the corresponding contexts are started in MPP 200.

As shown in FIG. 2, MPP 200 includes various co-processors, such as interface to scheduler (SCH) 204, Packet Integrity Checker (PIC) 210, Tree Engine 214, State Engine (SE) 218, Hash Engine (HE) 220, and Semaphore Engine (SEM) 222, each of which might operate substantially as described in related U.S. patent application Ser. No. 13/046,719 filed Mar. 12, 2011. For example, SE 218 might perform functions of a finite state machine (FSM) that operates on received packets, such as performing statistics counts and run traffic shaper scripts. HE 220 might perform hash functions to classify packets received by network processor 100, and to identify a flow corresponding to a given packet. Other hash table operations might also be carried out by HE 220. In general, HE 220 might operate substantially as described in related U.S. patent application Ser. No. 13/046,717 filed Mar. 12, 2011, Ser. No. 13/046,719 filed Mar. 12, 2011, and Ser. No. 13/403,468 filed Feb. 23, 2012. SCH 204 might start a new context when new tasks are received by MPP 200. In general, SCH 204 might operate substantially as described in related U.S. patent application Ser. No. 12/975,880 filed Dec. 22, 2010. A packet integrity check might typically be carried out by Packet Integrity Checker (PIC) 210, such as determining that a packet is properly formed according to a given protocol. PIC 210 might, for example, implement various CRC and checksum functions of MPP 200. As commands are performed by multithread processors (MTPs) 206, a given command might correspond to one or more tree instructions. Tree engine 214 fetches tree instructions from an external tree memory (not shown).

Semaphore Engine (SEM) 222 implements semaphore logic in MPP 200, and might support up to 1024 logical semaphores, which might correspond to 4 physical semaphores, each corresponding to 256 logical semaphores. Semaphores are used to manage atomic access to a hardware resource of network processor 100 and MPP 200. For example, for a context thread to utilize an instance of a hardware resource, the context thread might have to reserve a semaphore for that resource. A context might be allowed to have up to 4 outstanding physical semaphores. Semaphores are allocated and released by SEM 222 based on function calls received by function bus 212. SEM 222 might support ordered and unordered semaphore calls.

Other co-processors, such as atomic access controller 226, memory allocation unit 230, direct memory access (DMA) 232, output generator 234 and task generator 236 might operate as described herein. For example, atomic access controller 226 might control access to data by the various MTP 206(1)-206(N) stored in system memory 120. For example, atomic access controller 226 might typically maintain data coherency and operate as described in related U.S. patent application Ser. Nos. 13/192,140 and 13/192,104 both filed Jul. 27, 2011. Memory allocation unit (MAU) 230 might control memory requests to the MMB such as DMA 232 might perform direct memory access operations to system memory 120. Output generator 234 might typically generate output packets for storage in system memory 120. Task generator 236 might generate output tasks from MPP 200 for transmission of the task ring to one or more of μP cores 106 or accelerators 108) of network processor 100. Thus, by employing output generator 234 and task generator 236, output packets and output tasks are generated independently of one another.

As shown in FIG. 2, MPP 200 might include one or more multithreaded control processors (MTPs) 206(1)-206(N). Each of MTPs 206(1)-206(N) might operate in parallel to processing multiple tasks. Thus, the various other co-processors of MPP 200 might support multiple threads such that more than one job can be processed by MTPs 206(1)-206(N). For example, tree engine 214, which might typically be coupled to an external memory, might support 32 threads, HE 220 might support 64 threads, and PIC 210 might support 16 threads to achieve high performance of MPP 200. Each of the various co-processors 210, 214, 218, 220, 222, 226, 230, 232, 234 and 236 receive commands from MTPs 206(1)-206(N) via co-processor interface 228. When the command is processed, the co-processors might return a result back to the corresponding one of MTPs 206(1)-206(N).

Each of MTPs 206(1)-206(N) might include one or more Virtual Address Translation tables (VATs) 240, a corresponding local level-one (L1) cache 242 and LMEM 244. VATs 240 are used to store control data associated with each thread operation that define the level of data access allowed to the command in L1 cache 242. LMEM 244 is used for holding various task configuration data from a received task (e.g., inline task data, context variables, hash key values, and other task parameters). MTPs 206(1)-206(N) might also be coupled to one or more level-two (L2) caches 208 that are accessible only by the MTPs, and not by other processing modules of MPP 200 or network processor 100.

Each of MTPs 206(1)-206(N) might typically support 4 to 8 concurrent threads. The number of threads needed in the MTPs might be a function of required packet throughput, the frequency of co-processor calls, pipeline depth of each MTP 206 and a size of MTP state data. Storage for thread data might store state data of the MTP for each different thread in the MTP, but not necessarily for all threads in MPP 200 (e.g., threads processed by other ones of MTPs 206(1)-206(N) might not be tracked across the various MTPs). Context memory 216 is a high efficiency storage employed by MTPs 206(1)-206(N) to store state data for threads processed by MTPs 206(1)-206(N). Context memory 216 is large enough to hold state for all the threads in MPP 200, which might typically be 128 or 256 threads. One item of state data that might typically be stored (and restored) from context memory 216 when MTPs 206(1)-206(N) switch between threads is the state of the program counter (PC). The PC value might track a command count of a given thread of commands or instructions.

When a task is received by MPP 200 (e.g., at communication interface 202), the PC value is written into context memory 216. When a thread is available one of MTPs 206 (1)-206(N), thread updater 212 reads stored state data for a next task from context memory 216 and loads the state data into the corresponding MTP for the selected thread.

When the thread state data is loaded, the corresponding MTP can start execution of the instructions. While the instructions are being executed, state data for another thread might be loaded into the MTP to be staged for execution once the currently operated thread is complete, or if the currently running thread requires data from an external source. For example, if the currently running thread requires data from one or more of the co-processors of MPP 200, the corresponding MTP sends an indication to thread updater 212, and the current state data for the currently running thread is stored to context memory 216. The current thread might typically be termed as a "suspended thread", since operation on that thread is paused or suspended until the co-processor operation is completed. In some embodiments, a thread might also be suspended if data is requested from the cache (e.g., one of caches 242 and 208 etc.) and the data is not yet stored in the cache (a "cache miss"). The corresponding MTP then switches from the currently running thread to the staged thread, and starts execution for the staged thread. In some embodiments, while the staged thread is being processed, the state data for the previous thread state is stored into context memory 216, and state data for another thread might be loaded and staged to the MTP.

In some embodiments, threads might be assigned priority levels, for example, high or low priority. High priority thread data might not be written to context memory 216 when a high priority thread is suspended, and instead might remain stored within the corresponding MTP 206 (e.g., within caches 242) to allow the high priority thread to be resumed more quickly. Lower priority threads that are active within the corresponding MTP 206 might be suspended when an instruction for the low priority thread is complete, allowing the corresponding MTP 206 to switch to processing the high priority thread.

The thread that issued the co-processor call has its PC value stored in context memory 216. When the corresponding co-processor finishes execution, the co-processor, via co-processor interface 228 signals SCH 204 that the co-processor data is ready for the given thread. Responsive to the signal, SCH 204 requests thread updater 212 to load the thread state data from context memory 216 into the corresponding one of MTPs 206(1)-206(N). Thus, when the corresponding MTP resumes execution of a thread returning from a co-processor call, the MTP starts thread execution from where the thread execution was stopped to issue the co-processor call, based on the restored PC value. Further, thread switching in MPP 200 is handled automatically by thread updater 212 without intervention from control software (e.g., MTPs 206(1)-206(N)), and co-processor calls can be seamlessly integrated into the software since the control software need not maintain any awareness of other threads or processor state data.

FIG. 3 shows a flow diagram of exemplary task thread process 300 of MPP 200. At step 302, a task is received by MPP 200, for example from one of μP cores 106 or accelerators 108) of network processor 100. At step 304, the program counter value and other state data for the task are stored in context memory 216. At step 306, once one of MTPs 206(1)-206(N) has a processing thread available, at step 308, the state data for a next task selected by SCH 204 is loaded from context memory 216 to the corresponding one of MTPs 206 (1)-206(N) by thread updater 212. In some instances, for example at startup of network processor 100, at step 308, state data for a first thread might be loaded into the MTP for processing, and state data for a second thread might be loaded into the MTP to be staged. At step 310, MTP 206 processes a command for the thread, and updates the program counter value for the thread indicating that the command is being processed.

At step 312, if the processed command requires an operation by a co-processor module of MPP 200 (e.g., one of 210, 214, 218, 220, 222, 226, 230, 232, 234 and 236), then at step 313, MTP 206 sends a request for the co-processor operation to co-processor interface 228, which controls operations of the various co-processors and processing on the thread is suspended by MTP 206. Then processing continues to steps 314 and 316, which, in some embodiments, might occur substantially concurrently, as shown in FIG. 3. At step 314, thread updater 212 stores the state data and program counter value for the current thread to context memory 216, and loads the state data and program counter value for a next staged thread to the corresponding MTP 206. Substantially concurrently, at step 316, MTP 206 switches from the current thread to the originally staged thread, for the staged thread to become the active thread for processing by the MTP.

At step 318, data is returned from the co-processor via co-processing interface 228 and written to context memory 216. An indication that the data has been returned and is ready in context memory 216 is provided to SCH 204, such that SCH 204 can re-schedule the suspended thread. At step 320, SCH 204 adds the suspended thread to the list of threads available for scheduling to be processed by a corresponding one of MTPs 206. Processing returns to step 306 for the corresponding MTP 206 to process other commands of the current thread before reaching a point to switch processing to the staged thread (e.g., the current thread completes at step 324, the current thread needs a co-processor operation at step 312, the current thread has a cache miss, or the current thread is a low priority thread that has completed an instruction and the suspended thread is a high priority thread).

At step 312, if the processed command does not require an operation by a co-processor module of MPP 200, at step 323, if the processed command experiences a cache miss (e.g., data required for the command is not present in a local cache of MTP 206, e.g., caches 242 and 208), then at step 325, the required data is read from system memory 120. Processing continues to step 318 where the data can be stored to the cache, the cache miss resolved and, at step 320, the thread can be made available for scheduling by SCH 204. If there is not a cache miss, at step 324, if one or more commands are left to be processed by MTP 206 for the thread, then, at step 310, the next command is processed by the MTP. If, at step 324, no commands are remaining to be processed by MTP 206 for the thread, then at step 326, if any tasks remain (e.g., are staged in the MTP, or are stored in context memory 216 to be processed), then, at step 328, MTP 206 switches the staged thread, if any, to become the active thread for processing by the MTP and, at step 308, the state data for a next task selected by SCH 204 is loaded from context memory 216 to the corresponding one of MTPs 206(1)-206(N) by thread updater 212. In some instances, for example at startup of network processor 100, at step 308 state data for a first thread might be loaded into the MTP for processing, and state data for a second thread might be loaded into the MTP to be staged. If, at step 326, there are no tasks remaining to be processed, MPP 200 completes task processing at step 330 until a next task is received at step 302.

Interrupts might be treated by generating a new task that is received by MPP 200, rather than as a processor-specific interrupt signal received on a dedicated interrupt input. For example, as described herein an input task might be received from a timer event of network processor 100, or from other processing modules (e.g., accelerators 108) of network processor 100. Thus, described embodiments might not necessarily require dedicated interrupt ports, and might not necessarily require special operation of MTPs 206 to handle interrupts. Rather, a thread can be suspended automatically as described herein, and then a new task can be processed.

Thus, as described herein, in described embodiments, multithreading is used to provide a run-to-completion model for software running on one or more control processors with calls to the acceleration engines embedded in the software. The control processors are not thread-aware and do not have degraded performance when switching between threads.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. A method of processing multiple threads of commands in a network processor having a plurality of processing modules and at least one shared memory:

generating, by at least one of the plurality of processing modules, one or more tasks corresponding to each packet received by the network processor;

receiving, by a module packet processor (MPP) of the network processor, the one or more tasks;

associating, by a scheduler of the MPP, each received task with a command flow of the MPP, and writing, by a thread updater of the MPP, state data corresponding to the flow to a context memory of the MPP;

scheduling, by the scheduler, an order of processing of the command flows of the MPP;

if a processing thread of one or more multi-thread processors of the MPP is available:

loading, by the thread updater from the context memory, state data for at least one scheduled flow to a corresponding one of the multi-thread processors;

processing, by the corresponding multi-thread processor, a next command of the flow, the next command determined based on the loaded state data, wherein the step of processing the next command includes storing, by one or more virtual address translation tables in the corresponding multi-thread processor, control data associated with each thread operation that define an level of data access allowed to the next command in a local level-one cache in the corresponding multi-thread processor; and if the processed command of the flow requires operation of one or more of a plurality of co-processor modules of the MPP:

sending, by the multi-thread processor, a co-processor operation request to a co-processor interface of the MPP;

suspending processing of the first flow of the multi-thread processor; and switching, by the multi-thread processor, command processing from the first flow of the multi-thread processor to a second flow of the multi-thread processor.

2. The method of claim 1, wherein the step of loading, by the thread updater from the context memory, state data for at least one scheduled flow to a corresponding one of the multi-thread processors comprises:

loading state data for a first flow as a current thread of the multi-thread processor; and loading state data for a second flow as a staged thread of the multi-thread processor.

3. The method of claim 2, wherein the step of switching, by the multi-thread processor, command processing from the first flow of the multi-thread processor to a second flow of the multi-thread processor:

substantially concurrently:

storing state data for the current flow to the context memory;

switching, by the multi-thread processor, processing of commands from the current flow to the staged flow, based on the stored state data for the staged flow, the staged flow becoming the current flow of the multi-thread processor; and loading state data for a subsequent flow from the context memory to the multi-thread processor as the staged thread of the multi-thread processor, thereby automatically switching between processing threads without intervention by the multi-thread processor.

4. The method of claim 2, further comprising:

returning, by the co-processor module of the MPP corresponding to the co-processor operation request, data to the co-processor interface;

scheduling, by the scheduler, the flow corresponding to the returned data, such that the flow is loaded as a staged thread of the multi-thread processor.

5. The method of claim 4, further comprising:

assigning each flow a corresponding priority value;

switching, based on the priority value of the current thread of a multi-thread processor and the priority value of the staged thread of the multi-thread processor, processing between the current thread and the staged thread.

6. The method of claim 2, further comprising:

checking, by the multi-thread processor, for presence of data required by the processed command in a local cache memory of the multi-thread processor;

if the data is not present in the local cache:

sending, by the multi-thread processor, a request to read the data from the at least one shared memory;

suspending processing of the first flow of the multi-thread processor;

switching, by the multi-thread processor, command processing from the first flow of the multi-thread processor to a second flow of the multi-thread processor;

storing data read from the at least one shared memory to the local cache;

resolving the cache miss; and scheduling, by the scheduler, the flow corresponding to the returned data for processing by the multi-thread processor.

7. The method of claim 2, wherein if the processed command of the flow does not require operation of one or more of a plurality of co-processor modules of the MPP:

if one or more commands of the flow remain to be processed:

processing, by the multi-thread processor, the next command; and updating the state data corresponding to the flow;

otherwise:

if one or more flows remain to be processed:

switching, by the multi-thread processor, processing of commands from the current flow of the multi-thread processor to the staged flow of the multi-thread processor, based on the stored state data for the staged flow, the staged flow becoming the current flow of the multi-thread processor; and loading state data for a subsequent flow from the context memory to the multi-thread processor as the staged thread of the multi-thread processor, thereby automatically switching between processing threads without intervention by the multi-thread processor.

8. The method of claim 7, further comprising:

interrupting processing of a flow by:

generating a task that is received by the MPP; and suspending, in response to the received task, processing of a corresponding flow, thereby generating an interrupt without employing a dedicated interrupt input.

9. The method of claim 1, wherein the state data comprises a program counter value associated with the corresponding flow.

10. The method of claim 1, wherein the state data comprises one or more register values of the multi-thread processor corresponding to the flow.

11. A non-transitory machine-readable medium, having encoded thereon program code, wherein, when the program code is executed by a machine, the machine implements a method of processing multiple threads of commands in a network processor having a plurality of processing modules and at least one shared memory:

generating, by at least one of the plurality of processing modules, one or more tasks corresponding to each packet received by the network processor;

receiving, by a module packet processor (MPP) of the network processor, the one or more tasks;

associating, by a scheduler of the MPP, each received task with a command flow of the MPP, and writing, by a thread updates of the MPP, state data corresponding to the flow to a context memory of the MPP;

scheduling, by the scheduler, an order of processing of the command flows of the MPP;

if a processing thread of one or more multi-thread processors of the MPP is available:

loading, by the thread updater from the context memory, state data for at least one scheduled flow to a corresponding one of the multi-thread processors;

processing, by the corresponding multi-thread processor, a next command of the flow, the next command determined based on the loaded state data, wherein the step of processing the next command includes storing, by one or more virtual address translation tables in the corresponding multi-thread processor, control data associated with each thread operation that define an level of data access allowed to the next command in a local level-one cache in the corresponding multi-thread processor; and if the processed command of the flow requires operation of one or more of a plurality of co-processor modules of the MPP:

sending, by the multi-thread processor, a co-processor operation request to a co-processor interface of the MPP;

suspending processing of the first flow of the multi-thread processor; and switching, by the multi-thread processor, command processing from the first flow of the multi-thread processor to a second flow of the multi-thread processor.

12. The non-transitory machine-readable medium of claim 11, wherein the step of loading, by the thread updater from the context memory, state data for at least one scheduled flow to a corresponding one of the multi-thread processors comprises:

loading state data for a first flow as a current thread of the multi-thread processor; and loading state data for a second flow as a staged thread of the multi-thread processor.

13. The non-transitory machine-readable medium of claim 12, wherein the step of switching, by the multi-thread processor, command processing from the first flow of the multi-thread processor to a second flow of the multi-thread processor:

substantially concurrently:

storing state data for the current flow to the context memory;

switching, by the multi-thread processor, processing of commands from the current flow to the staged flow, based on the stored state data for the staged flow, the staged flow becoming the current flow of the multi-thread processor; and loading state data for a subsequent flow from the context memory to the multi-thread processor as the staged thread of the multi-thread processor, thereby automatically switching between processing threads without intervention by the multi-thread processor.

14. The non-transitory machine-readable medium of claim 12, further comprising:

returning, by the co-processor module of the MPP corresponding to the co-processor operation request, data to the co-processor interface;

scheduling, by the scheduler, the flow corresponding to the returned data, such that the flow is loaded as a staged thread of the multi-thread processor.

15. The non-transitory machine-readable medium of claim 14, further comprising:

assigning each flow a corresponding priority value;

switching, based on the priority value of the current thread of a multi-thread processor and the priority value of the staged thread of the multi-thread processor, processing between the current thread and the staged thread.

16. The non-transitory machine-readable medium of claim 12, wherein if the processed command of the flow does not require operation of one or more of a plurality of co-processor modules of the MPP:

if one or more commands of the flow remain to be processed:

processing, by the multi-thread processor, the next command; and updating the state data corresponding to the flow;

otherwise:

if one or more flows remain to be processed:

switching, by the multi-thread processor, processing of commands from the current flow of the multi-thread processor to the staged flow of the multi-thread processor, based on the stored state data for the staged flow, the staged flow becoming the current flow of the multi-thread processor; and loading state data for a subsequent flow from the context memory to the multi-thread processor as the staged thread of the multi-thread processor, thereby automatically switching between processing threads without intervention by the multi-thread processor.

17. The non-transitory machine-readable medium of claim 16, further comprising:

interrupting processing of a flow by:

generating a task that is received by the MPP; and suspending, in response to the received task, processing of a corresponding flow, thereby generating an interrupt without employing a dedicated interrupt input.

18. The non-transitory machine-readable medium of claim 12, further comprising:

checking, by the multi-thread processor, for presence of data required by the processed command in a local cache memory of the multi-thread processor;

if the data is not present in the local cache:

sending, by the multi-thread processor, a request to read the data from the at least one shared memory;

suspending processing of the first flow of the multi-thread processor;

switching, by the multi-thread processor, command processing from the first flow of the multi-thread processor to a second flow of the multi-thread processor;

storing data read from the at least one shared memory to the local cache;

resolving the cache miss; and scheduling, by the scheduler, the flow corresponding to the returned data for processing by the multi-thread processor.

19. A module packet processor (MPP) of a network processor having a plurality of processing modules and at least one shared memory, wherein the network processor generates one or more tasks corresponding to each packet received by the network processor, the MPP comprising:

a task interface configured to receive the one or more tasks;
a scheduler configured to (i) associate each received task with a command flow of the MPP, and (ii) schedule an order of processing of the command flows of the MPP;
one or more multi-thread processors configured to perform command operations for a flow of commands corresponding to each of the one or more tasks;
a thread updater configured to (i) write state data corresponding to a flow to a context memory of the MPP;
if a processing thread of one or more multi-thread processors of the MPP is available, the thread updater is further configured to load, from the context memory, state data for at least one scheduled flow to a corresponding one of the multi-thread processors;
the corresponding multi-thread processor configured to process a next command of the flow, the next command determined based on the loaded state data, wherein the corresponding multi-thread processor includes one or more virtual address translation tables configured to store control data associated with each thread operation that define an level of data access allowed to the next command in a local level-one cache in the corresponding multi-thread processor; and
if the processed command of the flow requires operation of one or more of a plurality of co-processor modules of the MPP, the multi-thread processor is further configured to:
send a co-processor operation request to a co-processor interface of the MPP; and
switch command processing from the first flow of the multi-thread processor to a second flow of the multi-thread processor.

20. The apparatus of claim 19, wherein the thread updater is further configured to:
load state data for a first flow as a current thread of the multi-thread processor; and
load state data for a second flow as a staged thread of the multi-thread processor.

21. The apparatus of claim 20, wherein the multi-thread processor is further configured to:
substantially concurrently:
store state data, via the thread updater, for the current flow to the context memory;
switch, by the multi-thread processor, processing of commands from the current flow to the staged flow, based on the stored state data for the staged flow, the staged flow becoming the current flow of the multi-thread processor; and
load state data for a subsequent flow from the context memory to the multi-thread processor as the staged thread of the multi-thread processor,
thereby automatically switching between processing threads without intervention by the multi-thread processor.

22. The apparatus of claim 21, wherein:
a co-processor module of the MPP corresponding to the co-processor operation request returns requested data to the co-processor interface; and
the scheduler is further configured to request that the thread updater load the state data of the flow corresponding to the returned data, such that the flow is loaded as a staged thread of the multi-thread processor.

23. The apparatus of claim 21, wherein if the processed command of the flow does not require operation of one or more of a plurality of co-processor modules of the MPP:
if one or more commands of the flow remain to be processed:
the multi-thread processor is configured to (i) process the next command and (ii) update the state data corresponding to the flow;
otherwise:
if one or more flows remain to be processed the multi-thread processor is configured to:
switch processing of commands from the current flow of the multi-thread processor to the staged flow of the multi-thread processor, based on the stored state data for the staged flow, the staged flow becoming the current flow of the multi-thread processor; and
load state data for a subsequent flow from the context memory to the multi-thread processor as the staged thread of the multi-thread processor,
thereby automatically switching between processing threads without intervention by the multi-thread processor.

24. The apparatus of claim 19, wherein the state data comprises a program counter value associated with the corresponding flow.

25. The apparatus of claim 19, wherein the state data comprises one or more register values of the multi-thread processor corresponding to the flow.

26. The apparatus of claim 19, wherein the one or more co-processor modules of the MPP comprise one or more of:
a hash engine configured to perform hash functions to classify packets received by network processor;
a state engine configured to operate a finite state machine (FSM) on packets received by the MPP;
an atomic access controller configured to control access by the one or more multi-thread processors to data stored in the at least one shared memory;
a semaphore engine configured to implement semaphore logic to manage atomic access to a hardware resources of the MPP;
a tree engine configured to retrieve tree instructions from a tree memory;
a memory allocation unit configured to control memory allocation and deallocation requests of the MPP to a memory manager of the network processor;
a direct memory access module configured to perform direct memory access operations to the at least one shared memory;
an output generator configured to generate output packets for storage in the at least one shared memory;
a packet integrity checker configured to determine that a packet is properly formed according to an associated protocol; and
a task generator configured to generate output tasks from the MPP for transmission over a task communication bus to one or more of the other processing modules of the network processor.

27. The apparatus of claim 26, wherein:
the tree engine is configured to support 32 concurrently active threads;
the hash engine is configured to support 64 concurrently active threads;
the packet integrity checker is configured to support 16 concurrently active threads; and
each multi-thread processor is configured to support 8 concurrently active threads.

28. The apparatus of claim 19, wherein each of the one or more multi-thread processors comprise:
a local level-one cache configured to temporarily store data for operation of the multi-thread processor;

a virtual address translation table configured to store control data associated with each thread operation, the control data defining allowed data access for each thread to data stored in the local level-one cache; and a local memory configured to store task configuration data from a received task, wherein the task configuration data comprises inline task data, context variables, and hash key values.

29. The apparatus of claim 19, wherein the network processor is implemented in an integrated circuit.

30. The apparatus of claim 23, wherein the scheduler is further configured to assign each flow a corresponding priority value; and the multi-thread processor is further configured to switch, based on the priority value of the current thread of a multi-thread processor and the priority value of the staged thread of the multi-thread processor, processing between the current thread and the staged thread.

31. The apparatus of claim 23, wherein the multi-thread processor is further configured to (i) generate a task that is received by the MPP and (ii) suspend, in response to the received task, processing of a corresponding flow, thereby generating an interrupt without employing a dedicated interrupt input.

32. The apparatus of claim 20, wherein:

the multi-thread processor is further configured to check for presence of data required by the processed command in a local cache memory of the multi-thread processor;

if the data is not present in the local cache:

the multi-thread processor is configured to:

send a request to read the data from the at least one shared memory;

suspend processing of the first flow of the multi-thread processor;

switch command processing from the first flow of the multi-thread processor to a second flow of the multi-thread processor;

store data read from the at least one shared memory to the local cache; and resolve the cache miss; and wherein the scheduler is further configured to schedule the flow corresponding to the returned data for processing by the multi-thread processor.

* * * * *